United States Patent

[11] 3,615,792

| [72] | Inventor | Frederick James Keene<br>Medford Lakes, N.J. |
|---|---|---|
| [21] | Appl. No. | 645,603 |
| [22] | Filed | June 13, 1967 |
| [45] | Patented | Oct. 26, 1971 |
| [73] | Assignee | E. I. du Pont de Nemours and Company<br>Wilmington, Del. |

[54] PROCESS FOR THE PREPARATION OF EMULSION COATINGS
4 Claims, No Drawings

[52] U.S. Cl.................................................. 106/170,
106/171, 106/172, 106/173 R, 106/173 RQ,
106/178, 106/189, 106/191, 106/198, 260/13,
260/14, 260/15, 260/16, 260/17 R

[51] Int. Cl.................................................. C08b 21/12,
C08b 21/14, B01f 3/08

[50] Field of Search.................................... 106/17 B,
198, 191, 171, 172, 173, 178, 189; 260/16, 17, 13

[56] References Cited
UNITED STATES PATENTS

| 3,458,328 | 7/1969 | Zola............................ | 106/170 |
| 3,421,919 | 1/1969 | Lin.............................. | 106/170 |
| 2,382,533 | 8/1945 | Auer........................... | 106/170 |
| 2,427,481 | 9/1947 | Weible et al................. | 106/170 |
| 2,591,904 | 4/1952 | Zola............................ | 106/170 |

Primary Examiner—Allan Lieberman
Attorney—John F. Schmutz

ABSTRACT: A method for making waterborne coating compositions containing both cellulose derivatives and resin additives comprising the preparation of a cellulose derivative emulsion and a resin emulsion, and then combining them.

PROCESS FOR THE PREPARATION OF EMULSION COATINGS

BACKGROUND OF THE INVENTION

Waterborne emulsion coating compositions have several advantages over coating compositions containing large quantities of volatile solvent. Volatile solvents are flammable and expensive. Solvent recovery systems are needed to recover and reuse the solvent.

Water emulsion coatings can also contain a larger proportion of film-forming material than solvent lacquers and thus heavier coatings can be put on in one coat and fewer coats are needed to put on a required thickness.

A unique water-emulsion coating system containing cellulosic derivatives, and particularly nitrocellulose as the film-forming agent, is disclosed in copending coassigned application Ser. No. 554,361 filed June 1, 1966, now U.S. Pat. No. 3,522,070. In addition to the foregoing advantage, such coatings formulated for application on wood and metal and laid down by these emulsions are equal or superior to solvent-based coatings in most respects except one, namely, cold crack resistance. The cold crack resistance is tested by cycling a panel coated with the film from low to high temperatures to see how easily the film cracks. Test results are an indication of a coatings's durability to stress caused by thermal shock and/or by dimensional changes in a wood substrate during service. Such stresses can occur from an abrupt temperature change during cold weather shipping, or from the swelling and contraction of wood with seasonal temperature and humidity changes. If the coating does not expand and contract together with its substrate, cracks will occur and detract from the appearance of the coated object.

SUMMARY OF THE INVENTION

The present invention comprises an improvement in the process for making waterborne coating compositions which comprise cellulosic polymer and modifying resin dispersed in water with an emulsifying agent, optionally together with plasticizers, coalescing agents, and other additives, said improvement comprising a. forming an emulsion of said polymer in water, b. forming a separate emulsion of said resin, in water, said resin having a melting point of less than 150° C. and said resin dispersion having a coalescibility of about that of said cellulose polymer dispersion, and c. mixing said cellulosic polymer and resin emulsions. The cellulose polymer emulsion, also known as a cellulose derivative emulsion, is preferably prepared by forming a water emulsion of about from 3 to 40% cellulose derivative, about from 0.5 to 12% plasticizer, about from 7 to 50% water, about from 0.1 to 5.0% emulsifier, and about from 30 to 75% of a volatile solvent for the cellulose derivative, said solvent boiling between about from 50 to 140° C. and distillable from the system at below 100° C., and preferably below 95° C, and distilling the volatile solvent from the emulsion. The resin additive emulsion is preferably prepared by mixing the resin at a temperature of about from 70 to 150° C., said resin comprising about from 25 to 65% of the resin emulsion, adding emulsifying agent and water in sufficient quantity to make the total concentration of emulsifier about from 0.1 to 5% and of water from about 35 to 75% in the resin additive emulsion. Said cellulose derivative emulsion and said resin additive emulsion are then combined by mixing.

DESCRIPTION OF THE PREFERRED EMBODIMENTS

Typically the cellulose derivative emulsion contains by weight, about from 10 to 70%, and preferably 25 to 50% of cellulose polymer, about from 15 to 65%, and preferably 20 to 35% of water, about from 0.5 to 10%, and preferably 2 to 5% of emulsifier, optionally up to 30%, and preferably 4 to 16% of plasticizer and up to 35%, and preferably 15 to 30% of coalescing agent, the total of plasticizer and coalescing agent preferably being at least 1% but usually less than 40% of the total basic composition. After mixing with the resin emulsion the resulting finished compositions contain, by weight based on the enumerated constituents, a. about from 10 to 40%, and preferably 15 to 25% of cellulosic polymer, b. up to 25%, and preferably 4 to 15% of plasticizer or its equivalent, c. about from 15 to 80%, and usually 40 to 50% of water, d. about from 0.5 to 10%, and preferably 0.7 to 5% of emulsifier, e. up to 30%, and preferably 5 to 15% of coalescing agent, and f. about from 1 to 30%, and preferably 15 to 25% of auxiliary resins, i.e., auxiliary film-forming polymer.

Other optional materials such as colorants, film-forming agents, inhibitors, curing agents, and mixtures of the foregoing alone or with other materials, can be added to the composition.

Preferably, the cellulose derivative emulsions are prepared by mixing the plasticizer, the volatile solvent, water, and emulsifier, to form an oil-in-water emulsion. This emulsion is combined with the cellulose derivative and the mixture is stirred until the cellulose derivative is a part of the emulsion. Alternatively, the cellulose derivative can be dissolved in all or a portion of the volatile solvent before incorporation into an emulsion with the water, emulsifier, and plasticizer. After the emulsion containing the cellulose derivative has been formed, the volatile solvent is distilled off, either alone or as an azeotrope with water while agitation is continued. This product represents the basic cellulose derivative emulsion.

Especially preferred cellulose derivative emulsions are prepared in a high shear mixer which maintains an attrition zone having a peripheral velocity of at least about 1000 feet/min. (508cm./sec.) and preferably about from 7000 to 25,000 feet/min. (3556 to 12,700 cm./sec.) as disclosed in copending, coassigned U.S. application Ser. No. 554,361 filed June 1, 1966, now U.S. Pat. No. 3,522,070. Mixing for about from 10 to 45 min. gives emulsified spherical particles containing the cellulosic polymer and having a number average particle diameter of less than 1.0 micron, and usually from about 0.1 to 0.8 micron, at least 70% of said particles being submicron, and substantially all of said particles being less than 3 microns in diameter. The size of these particles is determined by the methods used in the above copending application. All of the ingredients can be added simultaneously to the high shear mixer or, alternatively, the cellulose derivative can be dissolved in the volatile solvent in the mixer and then the additional ingredients added. When the high-shear mixer is used the water-soluble polymeric emulsion stabilizer is not a necessary part of the composition but can be used if desired.

The high shear mixer used should be of the type wherein a considerable degree of high speed agitation and shearing action is obtained. This is accomplished by establishing an attrition zone in the mill, repeatedly passing the emulsified cellulose polymer particles through this zone which subjects the particles to disaggregation and abrasion as the particles rub against each other and against the edges of the mixer.

The preferred high-shear mill for use in this process from the standpoint of speed and efficiency of obtaining the desired product is that described in U.S. pat. No. 2,628,081, issued Feb. 10, 1963 to Thomas J. Laird and the disclosure of that patent is hereby incorporated by reference. This mill has a stator with a rotor disposed within, said stator having narrow vertical slots through which the material being dispersed is thrown at high speed during operation. An impeller which turns with the rotor is disposed above the rotor and outside the stator. This impeller serves the purpose of drawing emulsion down from the main body of the fluid into the stator where it is forced through the narrow slots into the main body of emulsion again. The peripheral speed of the rotor should be at least 1000 feet per minute.

Other types of high-shear mills which can be used for making the product of the present invention are the Cowles dissolver, the operation of which is described in U.S. Pat. No. 2,767,170, issued Oct. 16, 1956; the Eppenbach Homomixer; the Manton-Gaulin Colloid Mill; The Ganlin Homogenizer; and others meeting the requirements given hereinbefore.

The resin additive emulsions are preferably made by softening the resin or a mixture of resins by heat at about from 70° to 150° C., adding emulsifier and water to form a composition having about from 25 to 65% resin additive, 35 to 75% water and 0.1 to 5% emulsifier, and agitating the composition to form an emulsion.

As a matter of convenience the emulsifier is usually added in about from 10 to 75% solution in water, the emulsion formed and the remaining water added.

To form the finished emulsion the two components are simply mixed. Preferably coalescing agents are also present in the formulation to produce a clearer film. Coalescing agents are liquids having a boiling point between 120° and 230° C., and usually between 130° and 230° C. and a relative rate of evaporation of between 0.01 and 1.0 and usually 0.01 and 0.8 referred to butyl acetate as 1.0 (determined by Shell Thin Film Evaporator at 0% relative humidity and 25° C.) (Paint and Varnish Production 46, No. 12, Nov. 1956) which exert solvent action on the cellulose derivative. These coalescing agents can all be added to the cellulose derivative emulsion before distillation of the volatile solvent, after distillation of the volatile solvent or part of the coalescing agent can be added to the cellulose derivative emulsion and the remainder to the resin additive emulsion as described hereinafter. The total concentration of coalescing agent based on the finished emulsion may be up to 30% and preferably about from 5 to 15%.

Examples of coalescing agents include methyl "Cellosolve," butyl "Cellosolve" acetate, diethylene glycol, "Cellosolve," butyl "Carbitol," methyl amyl acetate (2,4-dimethylbutyl acetate), methyl amyl ketone, diisobutyl ketone, isophorone, diacetone alcohol, "Cellosolve" acetate, ethyl lactate, and methyl "Carbitol."Glycol esters and ethers are particularly preferred. In some cases the coalescing agent can be the same volatile solvent used for making the initial emulsion. In these cases the distillation of the volatile solvent is stopped at a point to leave about from 2% to 30% solvent in the basic coating composition plus coalescing agent not including other additives.

In addition to one or more of each of the types of ingredients listed heretofore, the emulsion finishes of the present invention can contain other conventional additives including, for example, colorants, inhibitors, curing agents, freeze-thaw stabilizers, etc. Colorants including phthalocyanine pigments and inorganic pigment such as carbon black, titanium dioxide, lead chromate, iron oxide, zinc oxide, cadmium oxide, antimony oxide and chromium oxide can be used at levels of about 6% to about 25% based on the cellulose polymer present.

Particles of the resin additive emulsion and the cellulose derivative emulsion each should have approximately the same degree of coalescibility. Particle coalescence can be observed in electron photomicrographs of diluted emulsions after they are spread on glass and allowed to dry. Particle coalescence can be varied by varying the proportion of coalescing agent in the separate emulsions before mixing. For example, if a soft resin is used all of the coalescing agent can be present in the cellulose derivative emulsion. If a hard resin is used part of the coalescing agent usually should be added to the resin additive emulsion before mixing with the cellulose derivative emulsion. The quantity of coalescing agent in each emulsion necessary to give particles of similar coalescibility is easily determined by the procedure discussed hereinbefore.

Coalescence of the resin additive emulsion particles can also be varied by using a mixture of two or more resins of varying degrees of hardness.

When particles of the cellulose derivative emulsion and particles of the resin additive emulsion have similar coalescibility the outlines of discrete particles cannot be ascertained in electron photomicrographs made of the nonvolatile residue from the mixed emulsions. The particles merge into one another. This type of composition shows optimum cold crack properties. When particle coalescibility of the two emulsions are considerably different, electron photomicrographs of the nonvolatile residue from mixed emulsions show some discrete particles having well defined edges and cold crack properties are not as good.

The resins or resin mixture should have a melting point below 150° C. and preferably below 100° C. and be stirrable at the temperature used for emulsification. Resins which can be incorporated as modifying agents include, for example, low molecular weight, water insoluble resins such as rosin and rosin acids; rosin-modified phenolics; phenolic resins; glycerol, glycol and diethylene glycol esters of resin acids; toluenesulfonamide-formaldehyde resins; urea-formaldehyde resins; coumarone-indene resins dewaxed shellac; sandarac; dewaxed dammar; mastic gum; "Aroclor" 5460; short-oil coconut-oil phthalic alkyd resins such as "Rexyl"-99. Other additives used only in mixture with the foregoing include small proportions, i.e., up to about 5%, of waxes such as beeswax, candelilla, glyco wax, Japan wax, Montan wax, curicuri wax, spermaceti wax, opalwax, tallow carnuba; fatty acids such as stearic acid, linseed oil fatty acids, glyceryl esters of fatty acids, castor oil fatty acids; aromatic hydrocarbons such as terphenyl, (o or m) naphthalene; alcohols such as lauryl alcohol, cetyl alcohol, "Zonyl" RP (a fluoro compound) and others. Some of the substances are used to make lower cost systems with minimum sacrifices of film properties and some as flexibilizers.

The nature of the additives that can be added to the emulsion finishes of the present invention without severe impairment of the strength is governed primarily by the compatibility of the additive in the finished film, i.e., whether or not they exude from the finished film, precipitate from the finished film, or form a cloudy or hazy film. The present invention comprises the use of compatible mixtures of cellulose derivatives in the emulsion finishes. Because of this, additives that are normally incompatible with the cellulosic derivative can sometimes be used by adding another mutually compatible additive. For example, asphalts or paraffin waxes can be incorporated into nitrocellulose with which they are incompatible by adding mutual blending agent such as beeswax, stearic acid, dibutyl phthalate, or stearyl alcohol.

The cellulose derivatives used as film-forming agents in the process of the present invention are soluble in organic solvents and include polymeric cellulose esters and ethers such as cellulose acetate, cellulose nitrate (commonly called nitrocellulose), cellulose acetate benzoate, cellulose acetate crotonate, cellulose acetate butyrate, cellulose sorbate acetate, benzyl cellulose, ethylcellulose, benzyl cellulose acetate, and mixtures of one or more of the aforementioned cellulosic polymers. The preferred compositions contain a nitrocellulose of the types further described in copending, coassigned application Ser. No. 554,361, which is hereby incorporated by reference, having a viscosity of, for example, about from one-eighth to 500 seconds, but preferably has a viscosity of about one-fourth to 6 seconds, as determined by the ASTM Standard Method D–301–56, and a nitrogen content of about from 10.9 to 12.2%.

Nitrocellulose is generally sold commercially in an alcohol- or water-wet form for safety reasons. It can be used in the process of the present invention in either of these forms without drying. If the nitrocellulose is water-wet an appropriate compensation for the quantity of water in the nitrocellulose is made when adding the remainder of the water present in the composition. If the nitrocellulose is alcohol-wet the alcohol merely is another volatile ingredient to be removed by distillation.

The volatile solvent for the cellulose derivative is a solvent boiling below about 150° C. and above 50° C. at atmospheric pressure. If the solvent boils above 100° C. and usually 95° C., it must form an azeotrope, which boils about between 50° C.

and 100° C., and preferably 50° to 95° C., with water or other solvent present. Mixtures of suitable solvents can also be used. In this case every volatile organic solvent in the mixture must be capable of being removed by distillation below about 100° C. and preferably 95° C.

Suitable solvents include, for example, acetone, isopropyl acetate, tetrahydrofuran, ethyl acetate, methyl ethyl ketone, n-propyl acetate, methyl acetate, ethyl butyl ketone, acetyl-t-butyl methyl ether, isobutyl acetate, mesityl oxide, methyl isoamyl ketone, methyl isobutyl ketone, methyl n-butyl ketone, methyl n-propyl ketone, n-butyl acetate, sec-butyl acetate, diisobutyl ketone, diacetone alcohol, amyl acetate, 1-methylisoamyl acetate, and other aliphatic, cycloaliphatic and aromatic ethers, esters, ketones and alcohols.

Emulsifiers for preparing the finishes of the present invention are anionic emulsifiers either alone or mixed with up to about an equal quantity or more of nonionic emulsifiers. Emulsifiers of these classes are described in "Detergents and Emulsifiers—Up to Date," 1963, John W. McCutcheon Inc. Such emulsifiers can include, for example, alkaryl sodium sulfonates and alkyl sulfate as well as the others described in copending applications Ser. No. 554,361, which is incorporated herein by reference.

The plasticizers for the cellulose derivative include any of the conventional liquid or solid plasticizers melting below about 70° C. and boiling above 250° C., which alone or as mixtures will solvate the cellulose derivative at a 1 to 1 weight ratio at 100° C. The plasticizer must not form an azeotrope (e.g., with water, or with the aforementioned low-boiling solvent) which boils below about 120° C. and which contains more than 10% of the plasticizer. In the broad aspects of the invention, any one or more of the conventional plasticizers for the nitrocellulose can be used, or a resin can be used in place of all or part of the plasticizer. Examples of plasticizers for nitrocellulose can be found in copending coassigned application Ser. No. 554,361, now U.S. Pat. No. 3,522,070.

In order to get a good film on drying the emulsions of the present invention it is usually necessary to have a weight ratio of plasticizer and coalescing agent to nitrocellulose of at least 0.33 and to prevent undue softness of the film obtained the weight ratio of plasticizer to cellulose derivative should not be more than 1.5.

Antioxidants also can be included in the compositions of this invention. Examples of suitable antioxidants include secondary amines, phenolic derivatives, and other nitrogenous compounds. When used, antioxidants range about from 0.025 to 2% based on the weight of cellulose derivative.

The coating compositions of this invention can be applied to any of the conventional fluid coating techniques including flow, dip, spray, brush and roller coating techniques and dried for example, at room temperature to 150° C., and preferably 60° C., to 100° C. for 15 to 30 minutes.

Compositions of this invention are directed toward improved cold crack performance. The performance test is of particular significance with coatings applied to nonflexible substrates. The compositions of this invention are useful in coating metal, wood, and plastic, etc. They can be applied directly to substrates over conventional primers such as alkyd resin primers, aminoplast primers, etc. The compositions of this invention are characterized by their freedom from large portions of volatile organic solvent, by their safety and ease of application, by their high solids content, hence, high coating thickness per pass and particularly by their excellent cold-crack resistance.

The emulsion coatings of the present invention are further described and illustrated by the following examples in which parts and percentages, where given, are by weight. In the tests for cold-crack performance, 5-ply mahogany plywood panels are used for testing the emulsions. The plywood panels are prepared by the following procedure:

1. Condition 15 inch × 24 inch 5-ply mahogany panels to 6.0% to 8.0% moisture in the humidity oven at 110° F. and 40–45% relative humidity for 24 hours or longer. Measure moisture content with Moisture Register Model L2.

2. Sand panels lightly with 320 grit paper. Wipe to remove dust.

3. Spray one coat of NGR stain using a suction-type spray gun and about 35 p.s.i. air pressure. Air dry for 30 minutes.

4. Spray one application of solvent lacquer "wash coat" (5–8% solids and same nonvolatile composition as topcoat) using suction-type gun and 30p.s.i. air pressure. Air dry 30 minutes.

5. Scuff sand with 320 grit paper. Blow off dust with compressed air.

6. Spray with alkyd type filler using a pressure pot with 10 p.s.i. fluid pressure and 30 p.s.i. atomization pressure. Flash for 15 minutes. Pad in with a felt pad and then wipe clean, being careful not to wipe the filler out of the pores. Bake at 130° F. and 30% relative humidity for 90 minutes (130° F. dry bulb, 95° F. wet bulb). Air dry overnight.

7. Spray with solvent lacquer sealer (12–15% solids and same nonvolatile composition as topcoat but containing 5% zinc stearate based on solids) using a pressure pot with 10 p.s.i. fluid pressure and 50 p.s.i. atomization pressure. Apply 0.5 mil dry film thickness and air dry for 1 to 1½ hours.

8. Sand with 180–240 grit paper. Blow off dust with compressed air.

9. Spray the test coating to a dry film thickness of 2.0±0.2 mils. Use a suction-type spray gun and about 35 p.s.i. atomization pressure. The test portions of the panel are masked while the control portions are being sprayed with topcoat and vice versa.

EXAMPLE 1

Part A — Blended Emulsion

A mixture of 100 parts nitrocellulose ½sec), 20 parts dibutyl phthalate plasticizer, 65 parts methyl Carbitol, and 500 parts isopropyl acetate, is agitated to form a solution. This solution is mixed with a solution of 7 parts emulsifying agent, Gafac RE-610 (polyoxyethylene nonyl phenol esterified with phosphoric acid) in 28 parts of water and neutralized to a pH of 7 with NaOH, and with 308 parts of water with agitation in a high shear mixer having a peripheral velocity of greater than 1000 ft./min. for 15 minutes. The resulting number average particle size is about 0.1 to 0.8 microns. The volatile solvent is then distilled off along with excess water to give an emulsion containing 31.0% nitrocellulose, 6.2% plasticizer, 20.2% coalescing agent, 2.2% emulsifier and 40.3% water.

A second emulsion is made by mixing with low shear agitation at 100° C., 80 parts of "Rezyl 99" (nonoxidizing alkyd resin containing 34% oil) with 20 parts of "Cellolyn" 104 (a modified pentaerythritol ester of rosin), until a homogeneous composition results, and then adding 7 parts of "Gafac" RE-610 dissolved in 28 parts of water and neutralized to a pH of 7 with NaOH. Additional water (79 parts) is then added with agitation and the emulsion cooled. This emulsion contains 46.7% of resin additives, 3.3% of emulsifier and 50% water. The two emulsions have approximately equal coalescibility.

The two emulsions are then combined to give a final composition of 18.6% nitrocellulose, 3.7% dibutyl phthalate, 12.1% methyl "Carbotol," 2.6% emulsifier, 18.6% resin additives, and 44.3% water.

Part B — Single-Step Emulsion

A second complete emulsion is prepared wherein 80 parts of "Resyl" 99 and 20 parts of "Cellolyn" 104 are added to the isopropyl acetate solution containing nitrocellulose. After distillation of the volatile solvent the composition of this emulsion is 18.9% nitrocellulose, 3.8% dibutyl phthalate, 12.3% methyl "Carbitol," 1.3% emulsifier, 19.0% resin additives and 44.9% water. This emulsion is not made by the process of the instant invention but in a single step.

Part C — Comparison

Emulsion coatings made by the procedure of the present invention are compared with emulsion coatings made by the single emulsion technique and with conventional lacquer solvent coatings. The conventional lacquer coating has a 16% by weight nonvolatile content and was of the following formulation:

| Nonvolatile Composition | Parts by weight |
|---|---|
| Nitrocellulose (1/2 sec.) | 100 |
| "Resyl" 99 nonoxidizing alkyl resin 34% oil | 80 |
| "Cellolyn" 104 modified pentaerythritol ester of rosin | 20 |
| Dibutyl phthalate | 20 |

| Solvent Composition | Parts by volume |
|---|---|
| Methyl isobutyl ketone | 320 |
| Ethyl amyl ketone | 80 |
| Methyl isobutyl carbinol | 50 |
| Isopropyl alcohol | 62 |
| Ethanol | 38 |
| Toluene | 250 |
| Xylene | 200 |
|  | 1000 parts |

The coatings were applied at 2.0 ± 0.2 mils (dry) on glass for Sward hardness tests and 2.0 ± 0.2 mils (dry) over 0.5 mil (dry) solvent lacquer on mahogany panels for cold-crack tests (ASTM D-1211-57I). The coatings were air dried one-half hr. and then dried 1 hr. at 140° F.

|  | Blended Emulsion | Single-step Emulsion | Solvent Lacquer |
|---|---|---|---|
| % solids | 43 | 46 | 16 |
| Viscosity (c.p.s.) | 110 | 100 | 60 |
| Sward hardness | 42 | 42 | 38 |
| Cold crack (cycles to failure | 24+ | 1 | 24+ |

Similar improved compositions of this invention are obtained if an equal amount of cellulose acetate, cellulose acetate benzoate, or ethylcellulose is substituted for the nitrocellulose in the emulsions of part A above.

EXAMPLE 2

Part A

An emulsion is prepared using the procedure of example 1, part A, substituting butyl "Cellosolve" acetate for the methyl "Carbitol." The final emulsion has the same percentage composition as in example 1, part A.

Part B

An emulsion is prepared using the procedure of example 1, part B, substituting butyl "Cellosolve" acetate for the methyl "Carbitol."

Part C

The above emulsions are compared for hardness and cold-crack resistance as described in example 1, except that elevated temperature was not employed for drying.

|  | II-A | II-B |
|---|---|---|
| Viscosity (c.p.s.) | 480 | 400 |
| Sward hardness | 30 | 36 |
| Cold-crack* cycles to failure on wood | 17 | 12 |
| Cold-crack on metal; % of area cracked after 10 Cycles** | 1.0 | 20 |

*ASTM D-1211-57 T
**Metal panels cycled 20 min. at 131° F. and then 20 min. at −20° F.

Three emulsions are prepared having the following compositions:

|  | Parts by Weight | | |
|---|---|---|---|
| 1/2 Sec. NC | Emulsion A | Emulsion B | Emulsion C |
|  | 100 |  | 100 |
| Plasticizers |  |  |  |
| Dibutyl phthalate | 10 |  | 10 |
| Dioctyl phthalate | 10 |  | 10 |
| Coalescing Agent (Me "Carbitol") | 68 |  | 68 |
| Emulsifier | 7 | 7 | 14 |
| Soft Alkyd Resin |  | 80 | 80 |
| Hard Rosin Ester |  | 20 | 20 |
| Water | 129 | 88 | 122 |

EXAMPLE 3

Emulsions A and C are prepared by dissolving all ingredients, except emulsifier and water, in 500 parts by weight of isopropyl acetate and then mixing for 15 minutes in a high shear, high speed mixer having a peripheral velocity of about 1000 ft./min., together with 336 parts of water containing the specified amount of "Gafac" RE-610 emulsifier and neutralized to pH of 7 with NaOH. The particle size of the resulting emulsion is between 0.1 and 0.8 microns. The emulsions are then evaporated to remove all the low boiling solvent and a portion of the water. A small amount (4–8 parts) of Me "Carbitol" also evaporates, but is returned to the concentrated emulsions as a 1/1 solution in water.

Emulsion B is prepared by mixing the resins at 100° C., until homogeneous using low speed agitation, followed by addition of the emulsifier as a 20% aqueous solution neutralized to a pH OF 7 with NaOH. The remaining water (60 parts) is then added, and the emulsion allowed to cool. Emulsion A and B have approximately equal coalescibility. The emulsions are tested for cold-crack resistance after combining A and B as in example 1.

|  | Emulsion Blend A & B | Single-Step Emulsion C | Solvent Lacquer Control* |
|---|---|---|---|
| Cold-Crack Performance** |  |  |  |
| % of Panels Passing 10 cycles | 100 | 20 | 95 |
| % of Panels Passing 25 cycles | 95 | 5 | 90 |

*Solvent lacquer is as described in example 1 and is of same nonvolatile composition as the emulsions (excluding emulsifier).
**The coatings are spray applied at 2.0 ± 0.2 mils dry thickness over 0.5 mils (dry) solvent sealer on mahogany panels prepared as previously described. The coatings are air dried one-half hr. and then 1 hr. at 140° F.

I claim:

1. A process for making waterborne coating compositions comprising nitrocellulose and modifying resins emulsified in water with an emulsifying agent, which process comprises (a) forming an emulsion of nitrocellulose and emulsifier in water, (b) forming an emulsion of said resins, water and emulsifier, said resins having a melting point of less than 150° C. and being stirrable at the temperature of emulsification, said resin emulsion having a coalescibility of about that of said nitrocellulose emulsion, and (c) mixing said nitrocellulose and resin emulsions: and wherein said nitrocellulose emulsion is prepared by dissolving nitrocellulose in a solvent, said solvent comprising about from 30–75% by weight of said nitrocellulose emulsion, said solvent having a boiling point of about from 50°–140° C. and distillable from the system at below 100° C., adding said water and emulsifier, along with about from 0.5–12% of a plasticizer and up to 35% of a coalescing agent, and then distilling said solvent from the resulting nitrocellulose emulsion; and further wherein said resin emulsion is prepared by softening said resins by heating at a temperature of about from 70°–150° C., adding said water and emulsifier and agitating to form an emulsion.

2. A process of claim 1 wherein said nitrocellulose emulsion comprises about from 3–40% nitrocellulose, about from 7–50% water, and about from 0.1–5.0% emulsifier, and said resin emulsion comprises about from 25–65% resins, about from 0.1–5% emulsifier, and about from 35–75% water.

3. A process of claim 1 wherein said plasticizer and coalescing agent together comprise about from 1 to 40 percent of said nitrocellulose emulsion.

4. A process of claim 3 wherein the particles of said nitrocellulose emulsion have a number average particle diameter of about 40% to 0.8 micron.

PO-1050
(5/69)

UNITED STATES PATENT OFFICE
CERTIFICATE OF CORRECTION

Patent No. 3,615,792          Dated October 26, 1971

Inventor(s) Fredrick James Keene

It is certified that error appears in the above-identified patent and that said Letters Patent are hereby corrected as shown below:

Column 8, line 75, change "40%" to read -- 0.1 --.

Signed and sealed this 28th day of March 1972.

(SEAL)
Attest:

EDWARD M. FLETCHER, JR.
Attesting Officer

ROBERT GOTTSCHALK
Commissioner of Patents